G. GRAHAM.
CHAIN CLAMP.
APPLICATION FILED AUG. 7, 1913.
1,117,662.
Patented Nov. 17, 1914.
2 SHEETS—SHEET 1.
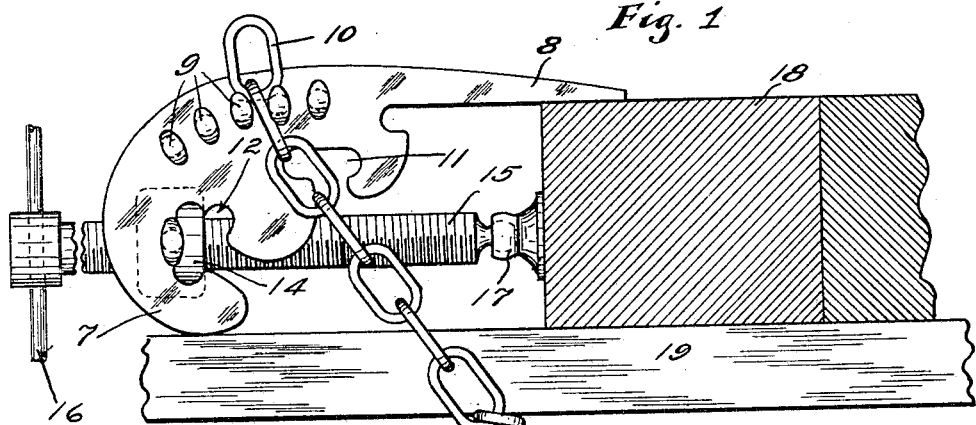
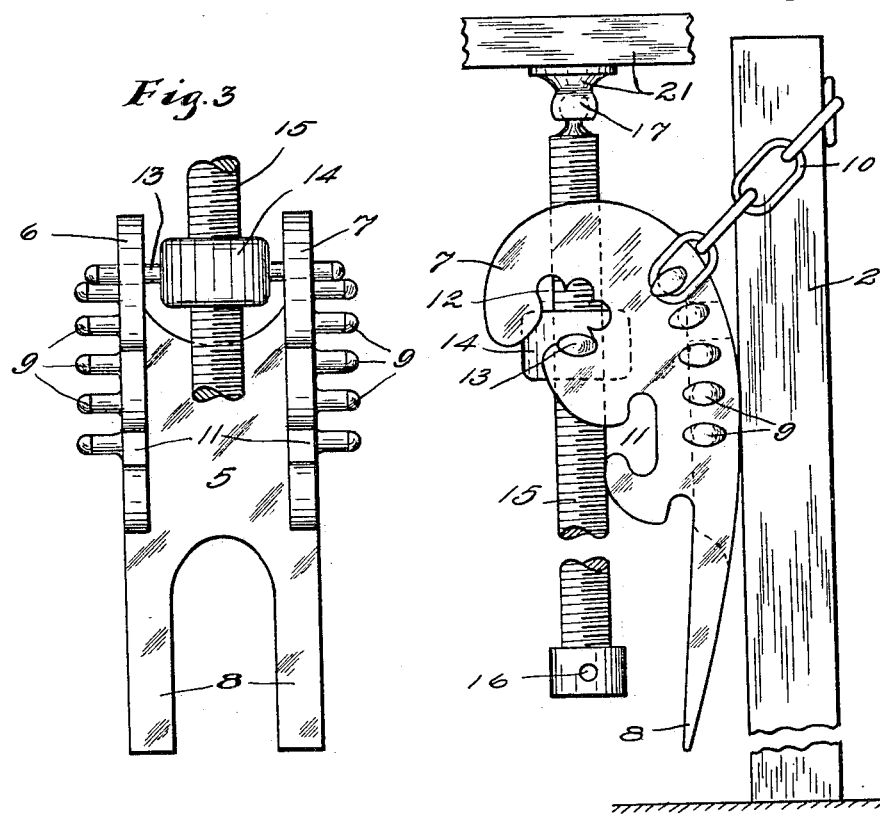
WITNESSES:
H. L. Opsahl.
F. C. Matheny.
INVENTOR
George Graham
BY
C. D. Haskins
ATTORNEY

G. GRAHAM.
CHAIN CLAMP.
APPLICATION FILED AUG. 7, 1913

1,117,662.

Patented Nov. 17, 1914.
2 SHEETS—SHEET 2.

WITNESSES:
Frank Warren
F. C. Matheny

INVENTOR
George Graham
BY
C. D. Haskins
ATTORNEY

UNITED STATES PATENT OFFICE.

GEORGE GRAHAM, OF SAN FRANCISCO, CALIFORNIA, ASSIGNOR OF ONE-HALF TO WILLIAM T. A. FAULKNER, OF SEATTLE, WASHINGTON.

CHAIN CLAMP.

1,117,662.     Specification of Letters Patent.     Patented Nov. 17, 1914.

Application filed August 7, 1913. Serial No. 783,574.

*To all whom it may concern:*

Be it known that I, GEORGE GRAHAM, a citizen of the United States, residing at San Francisco, in the county of San Francisco and State of California, have invented a certain new and useful Improvements in Chain Clamps, of which the following is a specification.

My invention relates to improvements in chain clamps and its object is to provide a strong, simple and efficient chain clamp that may be employed for clamping together different things in different ways and for exerting force between a fixed object and a movable object.

I accomplish this object by devices illustrated in the accompanying drawings in which—

Figure 4:
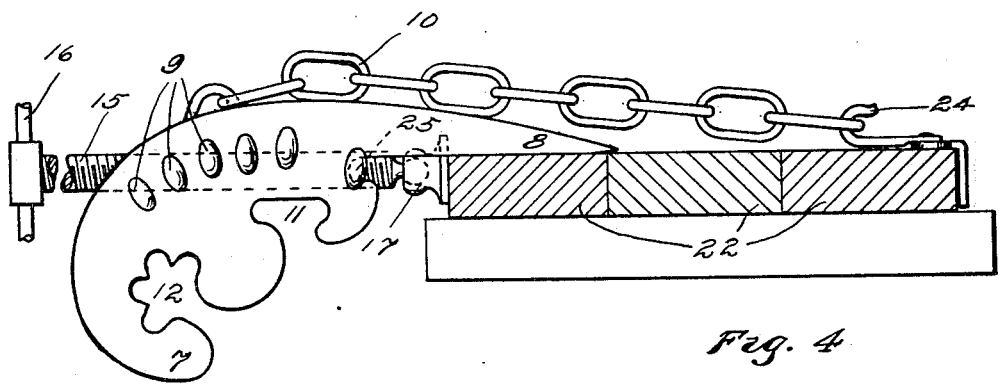
Figure 5:
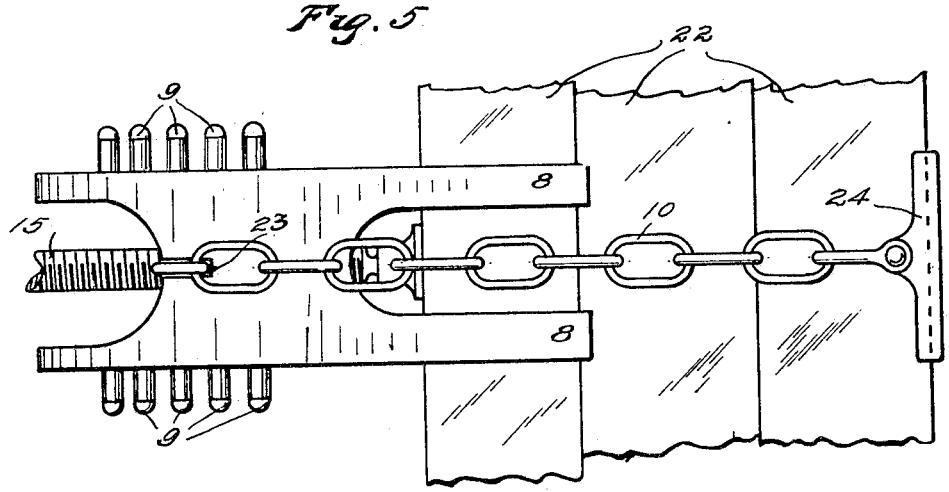
Figure 6:
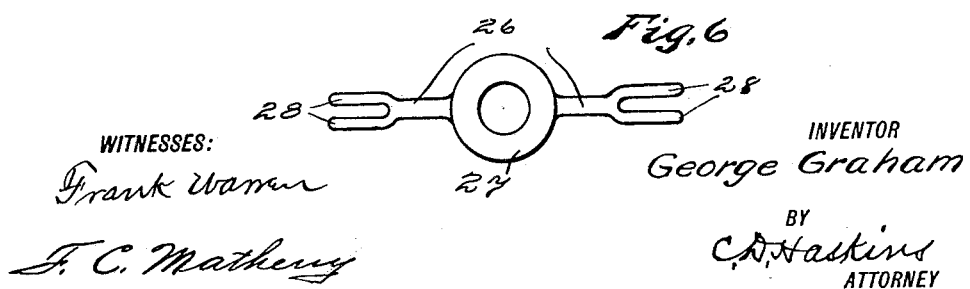

Figure 1, is a view in side elevation of my device as it may appear when used as a clamp, Fig. 2 is a view in side elevation of the same, as it may appear when used as a lifting jack, Fig. 3 is a front elevation of the same, a portion of the thrust bolt being broken away, Fig. 4 is a view in side elevation of my device illustrating one of its uses, Fig. 5 is a view in rear elevation of the same and Fig. 6 is a plan view of a modified form of a detail of my invention.

Like reference numerals indicate like parts throughout the drawings.

Referring to the drawings, 5 is a frame which is formed with two similarly constructed integral side members 6 and 7 and provided with integral clamping arms 8 which project from one of its ends. A plurality of fixedly secured studs 9 are disposed to project from the exterior surface of each of the side members 6 and 7 and are so disposed that a supporting chain 10 may be drawn between said studs, as illustrated in Fig. 1, or may be hooked over one of said studs, as illustrated in Fig. 2. The side members 6 and 7 are of a rounded or oval shape and each is formed with notches 11 and 12, of circular form, that are adapted to have the spindle 13 of a threaded nut 14 disposed therein. A screw-threaded shaft 15 is provided with cross-arms 16 at one of its ends, by means of which it may be turned, and with a swiveled head 17 at its other end, to adapt it to be screwed back and forth within the nut 14.

The frame 5 is formed with a curved back surface which curved surface may bear at different points upon a fixed object when the device is being used as a lifting jack, as illustrated in Fig. 2. In Fig. 1, I have shown my chain clamp as it may appear when it is to be used to clamp a plank 18 into a desired position preparatory to securing it to a studding 19. When used for this purpose the clamping arms 8 are placed on the outside surface of the plank to be clamped, then the chain 10 is passed around the studding 19 and secured to the studs 9 on either side of the frame 5 with the curved front portion of the frame 5 resting against the studding 19, as illustrated in Fig. 1, the spindle 13 may then be placed in the notch 11 and the bolt 15 rotated by turning the cross-arms 16 in the proper direction to cause the swivel head 17 to exert a pressure against the top of the plank 18, which pressure may bring tension on the chain 10 and cause it to bind on the studding 19 thus causing a pressure to be exerted by the clamping arms 8 and in this manner causing the plank 18 to be drawn inwardly and downwardly against the adjacent plank and against the studding 19 where it may be secured before the pressure of the clamp is released.

In placing a plank to form a curved wall, as the wall of the bow of a ship or the like, my chain clamp is useful in drawing the plank inwardly against the studding and more particularly in drawing the last end that is to be nailed inwardly against its studding.

In Fig. 2, wherein I have shown my chain clamp as it may appear when it is to be used as a lifting jack, 20 is a standard or post that may be placed on any solid foundation, as the ground to support said chain clamp, and 21 is the object to be raised.

The chain 10 may be hooked over one of the studs 9, thence it may be passed around the post 28 and hooked over another stud 9 on the opposite side of the frame 5 as illustrated in Fig. 2, to support the weight that is to be lifted. The spindle 13 of the threaded nut 14 may then be placed in one of the notches 11, 11 and 12, 12, and the shaft 15 rotated to cause the swivel head 17 to engage the object 21 to lift it. When a pressure is exerted on the frame 5 by the shaft 15 tension is exerted on the chain 10 and the frame 5 is caused to press against the post 28.

The pressure exerted by the clamping arms 8 on the side of the plank 18 due to a given force on the shaft 15 may be varied by varying the position of attachment of the chain 10 on the studs 9, thus if the chain 10, as shown in Fig. 1, be secured to the studs 9 adjacent the clamping arms 8, a greater pressure will be exerted on the plank 18 by said clamping arms than if said chain be secured to the stud 9 that are farther removed from said clamping arms 8.

In Figs. 4 and 5 wherein I have illustrated means by which my chain clamp may be adapted to clamp together a plurality of planks 22, 22, 22 the clamping arms 8 being disposed to rest upon one of said planks 22 while one end of the chain 10 is hooked within a notch 23 provided in the frame 5, the other end of the chain 10 being secured to a hook 24 that is adapted to hook over the edge of plank 22 that is farthest removed from the frame 5 in such manner that when tension is exerted on the chain 10 it shall act to draw together the planks 22, 22, 22 and also shall cause the chain 10 to draw over and bear down upon the back of the frame 5 thus to hold said frame in its proper position. After the chain 10 has been properly secured, the spindle 13 may be placed in a notch 25 adjacent to clamping arms 8, and the bolt 15 may be rotated in a direction to cause the swivel head 17 to exert a pressure against the edge of the adjacent plank 22 which pressure brings tension on the chain 10 and causes said chain to clamp the planks 22, 22, 22, together, in which position they may be secured before the pressure of the clamp is released.

In Fig. 6 I have illustrated a modified form of spindle 26 which may be associated with a threaded nut 27 similar to the threaded nut 14, said spindle 26 being formed to have bifurcated ends 28 between the members of which the chain 10 may be placed to hold it when it is found necessary to secure the chain 10 directly to the spindle 26.

Manifestly other forms of lifting means may be substituted for the threaded shaft 15 and nut 14 herein shown and various other changes in my device may be resorted to without departing from the spirit of my invention or sacrifcing any of its advantages.

What I claim is:

1. In a chain clamp of the class described, the combination with a frame having a plurality of notches provided in the sides thereof, of a threaded nut provided with trunnions that are adapted interchangeably to bear in said notches, a screw-threaded bar adapted to be screwed within said threaded nut to exert a pressure on the object to be clamped, and means adapted to secure said frame to a support.

2. In a chain clamp of the class described, the combination with a rocker shaped frame having two oppositely disposed perpendicular sides, of clamping arms associated with said frame, notches provided in the sides of said frame, a threaded nut provided with trunnions adapted to fit interchangeably in said notches, a threaded bolt adapted to be screwed within said threaded nut to exert a pressure on the object to be clamped, studs disposed to project from either side of said frame and a chain connecting with said studs to secure said frame to a support.

3. In a chain clamp of the class described, the combination with a frame having two oppositely disposed perpendicular sides, of clamping arms disposed to project from one end of said frame to rest on the object to be clamped, a thrust screw associated with said frame whereby a pressure may be exerted on the object to be clamped, a chain adapted to secure said frame to a support in such manner that when pressure be exerted on the object to be clamped it shall cause pressure to be exerted by said clamping arms, and means for varying the pressure of said clamping arms relative to the pressure of said thrust screw said means consisting in a plurality of spaced studs with which said chain may be associated.

In witness whereof, I have hereunto subscribed my name this 25th day of June A. D., 1913.

GEORGE GRAHAM.

Witnesses:
JOHN C. GIANDONI,
CHAS. AVERILL.

Copies of this patent may be obtained for five cents each, by addressing the "Commissioner of Patents, Washington, D. C."